United States Patent
Webster et al.

[19]

[11] Patent Number: 6,052,121
[45] Date of Patent: *Apr. 18, 2000

[54] DATABASE GRAPHICAL USER INTERFACE WITH USER FREQUENCY VIEW

[75] Inventors: Roger Webster, San Jose; Deanna McCusker, Palo Alto, both of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,616

[22] Filed: Dec. 31, 1996

[51] Int. Cl.⁷ ..................................................... G06F 7/00

[52] U.S. Cl. ........................... 345/329; 345/339; 345/331

[58] Field of Search ..................................... 345/329, 331, 345/339, 356, 357, 440, 968, 338; 707/501, 503

[56] References Cited

U.S. PATENT DOCUMENTS

| | | | |
|---|---|---|---|
| 5,127,003 | 6/1992 | Doll, Jr. et al. | 370/259 |
| 5,297,249 | 3/1994 | Bernstein et al. | 345/350 |
| 5,301,315 | 4/1994 | Pellicano et al. | 707/4 |
| 5,446,842 | 8/1995 | Schaeffer et al. | 345/331 X |
| 5,481,666 | 1/1996 | Nguyen et al. | 345/357 |
| 5,500,929 | 3/1996 | Dickinson | 345/356 |
| 5,522,066 | 5/1996 | Lu | 707/1 |
| 5,537,618 | 7/1996 | Boulton et al. | 345/326 |
| 5,544,302 | 8/1996 | Nguyen | 345/326 |
| 5,566,291 | 10/1996 | Boulton et al. | 345/326 |
| 5,572,643 | 11/1996 | Judson | 709/218 |
| 5,623,590 | 4/1997 | Becker et al. | 345/326 |
| 5,632,022 | 5/1997 | Warren et al. | 345/350 |
| 5,636,350 | 6/1997 | Eick et al. | 345/356 |
| 5,675,788 | 10/1997 | Husick et al. | 707/104 |
| 5,721,906 | 2/1998 | Siefert | 345/329 X |

OTHER PUBLICATIONS

Brown, Mark R., "Using Netscape 2", Que Corporation, pp. 369, 385, 389 and 390.

Freeland, Pat and Stephen Londergan, "Lotus Notes 3.0/3.1 for Dummies", (San Mateo: IDG) pp. 27–34.

"Microsoft Windows 3.1 Step by Step", Microsoft Press, 1992, pp. 167, 172, 59, 67,89 and 90.

*Inside Taligent Technology*, Sean Cotter et al., Jun. '95, pp. 74–109 and pp. 172–210.

*Presentation and Compound Document Framework Concepts*, Taligent, Inc. 1995, pp. 1–66.

*Desktop Frameworks Concepts*, Taligent, Inc. 1995, pp. 1–40.

*CommonPoint Application System, Human Interface Guidelines*, Taligent, Inc., 1995, pp. 1–79.

Primary Examiner—Raymond J. Bayerl
Assistant Examiner—Cao H. Nguyen
Attorney, Agent, or Firm—Kudirka & Jobse, LLP

[57] ABSTRACT

A method and apparatus generates a graphical user interface that summarizes information in an easy and user-friendly format in a database which stores topics and responses to those topics. To that end, the graphical user interface includes a user frequency view and an adjacent report view. The user frequency view includes a two-dimensional grid having indicia identifying one or more users along the horizontal dimension, and an index listing a plurality of topics along the vertical dimension. The grid forms a plurality of intersecting horizontal topic rows and vertical user identifying columns. Each intersection of a topic row and user identifying column may include indicia that display the number of responses to each of the listed topics by each of the users. The report view includes a listing of the titles of each response to a topic selected in the index, or the titles of each response by a user to a selected topic.

17 Claims, 9 Drawing Sheets

Company News - All Documents - Lotus Notes

File  Edit  View  Create  Actions  Window  Help

All Documents
Folders and Views
My Favorites
By Author
By Category
Archive Logs
Agents
Design 11/17/95  SuperPro tennis racquets [Peter Carroll]
  Will this replace another line that we carry? [Susanna Levine]
  Yes. NoPoint racquets are history [Peter Carroll 11/17]
  These are big sellers and high quality [Stephanie Mahar 11/17]
  Some good features about SuperPro [Micki Soler] 11/20

12/11/95  Jump-in-the-Boat fishing rods [Stephanie Mahar]
  Sounds fishy to me [Michael Thompson] 12/12
  Please get me more information [Stephanie Mahar 12/12]
  More info about Jump-in-the-Boat [Stephanie Mahar 12/14]
  Their numbers are wrong [David Yo 12/15]

SuperPro tennis racquets
Peter Carroll on 11/17/95 at 11;10 AM
Category: New Products We will soon be carrying SuperPro tennis racquets. A SuperPro

*Figure 2*

Figure 6

DATABASE GRAPHICAL USER INTERFACE WITH USER FREQUENCY VIEW

RELATED APPLICATIONS

This application contains subject matter which is related to the following applications: "Database Graphical User Interface with Calendar View", "Database Graphical User Interface with Outline View" and "Database Graphical User Interface with Tabbed User View", all filed by Roger Webster and Nicholas Lerissa on an even date herewith and assigned to the present assignee.

FIELD OF THE INVENTION

This invention relates generally to computer databases and, more particularly, to graphical user interfaces for accessing multiple-user databases.

BACKGROUND OF THE INVENTION

Computer systems typically store large collections of data in databases in non-volatile computer memory. Data stored in databases commonly is organized into individual records which themselves are organized in a logical hierarchical manner that simplifies use of that database. Depending upon the database access policy, each record of the database may be accessed, reviewed, modified, or deleted by an authorized database user. When used in a business context for storing information relating to software development by a software development company, for example, data stored in the database may include data relating to projects being developed by the company, comments by employees relating to current technology of the company, and technical data related to ongoing company projects.

Most records in a database are accessible to a user through a "graphical user interface" (GUI). GUIs provide a visual metaphor of a real-world scene, such as a desktop, featuring icons that the user can manipulate with a pointing device, such as a mouse. The database user therefore may access a selected database by clicking on a GUI button representing the database, responsively causing the computer to display the contents of the selected database in an easy to understand format. This format itself is a GUI that enables the user to further access and manipulate the database.

One type of database application program product in widespread use is Lotus Notes™ (Notes), available from Lotus Development Corporation of Cambridge, Mass. Notes enables a user to construct a database that may be accessed by multiple users through a Notes-based GUI. FIGS. 1 and 2 show exemplary Notes GUIs used with a multi-user database that stores topics, responses replying to the topics (topic responses), and responses replying to the responses (reply responses). Notes organizes the data in the exemplary database by grouping the topics, and their corresponding responses, into folders.

The user may access the exemplary Notes database by clicking on a database access button (FIG. 1), which responsively displays the GUI shown in FIG. 2. The GUI in FIG. 2 includes a navigation pane for displaying the folders in the database, a view pane for viewing the topics and titles of the responses stored in the folders listed in the navigation pane, and a preview pane for displaying the content of a response selected in the view pane.

Although the Notes GUI displays some information about the topics and responses, such as the title of a response, date of the response, and the author of the response, it does not tabulate a summary of this information and other related data. For example, summaries with indicia relating to the number of replies per user per topic are not displayed. Similarly, the Notes GUI does not display indicia or information relating to the number of replies to any one topic on each of several days, weeks, months, or years. Absent a GUI displaying such summaries, a user requiring this information necessarily would be required to manually tabulate these summaries while scrolling through the Notes GUI. Such a process is time consuming and inefficient.

Accordingly, it would be desirable to provide a GUI that summarizes database information in a simple, easy to understand, user-friendly format. It also would be desirable for this GUI to facilitate user access to the database records directly from the GUI. It is among the general objects of the invention to provide such a device and method.

SUMMARY OF THE INVENTION

In accordance with one aspect of the invention, a multiple user database may be accessed through a GUI which summarizes, in an easy and user-friendly format, the number of responses to any one topic on each of several days, weeks, months, years, or any other time designation. To that end, the GUI includes a calendar view and an adjacent report view. The calendar view is a two-dimensional grid having a timeline along a horizontal dimension, and an index listing a plurality of topics along the vertical dimension. The grid forms a plurality of intersecting horizontal topic rows and vertical time columns. Each intersection of a topic row and time column may include indicia that display the number of responses to the listed topics on the day, week, month, or year designated in a given time column. The report view includes a listing of the titles of each response to a topic selected in the index by a user.

In accordance with another aspect of the invention, the database may be accessed through a GUI which summarizes, in an easy and user-friendly format, the number of responses to a given topic by one or more of a plurality of users. To that end, the GUI includes a user frequency view and an adjacent report view. The user frequency includes a two-dimensional grid having indicia identifying one or more users along the horizontal dimension, and an index listing a plurality of topics along the vertical dimension. Similar to the previously described GUI, the grid forms a plurality of intersecting horizontal topic rows and vertical user identifying columns. Each intersection of a topic row and user identifying column may include indicia that display the number of responses to each of the listed topics by each of the users. The report view includes a listing of the titles of each response to a topic selected in the index, or the titles of each response by a user to a selected topic.

In accordance with yet another aspect of the invention, the database may be accessed by a GUI having an outline view that lists each of the responses under a topic in outline form, and an adjacent response chain view having indicia for accessing the content of each response in a response chain (described below) to a selected response. A response may either be a response to a topic (topic response) or a response to a previously posted response (reply response). The response chain therefore includes a selected response and any other responses that are directly linked, by responses, between the selected response and the topic.

In accordance with still another aspect of the invention, each of the above mentioned inventive GUIs includes graphical indicia indicating which users are viewing the GUI. The indicia may be colored text.

In accordance with another aspect of the invention, the GUI displays information relating to a database user and includes means for connecting to the user's world wide web home page. To that end, the GUI includes a display view having indicia related to the user, and a plurality of tabs adjacent to the display view for changing the indicia in the display view. Among the indicia in the display view is text identifying the world wide web home page address for the user. Clicking on the world wide web address causes the computer to directly connect to the user's home page.

It is among the objects of the invention to provide a database GUI that simplifies access to the database.

It is another object of the invention to provide a database GUI that summarizes database information in an easy, user-friendly format.

BRIEF DESCRIPTION OF THE DRAWINGS

The foregoing and other objects and advantages of the invention will be appreciated more fully from the following further description thereof with reference to the accompanying drawings wherein:

FIG. 2 is an illustration of a prior art Notes GUI displaying the contents of a Notes database;

FIG. 6 is an illustration of a third database GUI having a user frequency view and a report view;

DETAILED DESCRIPTION OF ILLUSTRATIVE EMBODIMENTS

Figure 1:
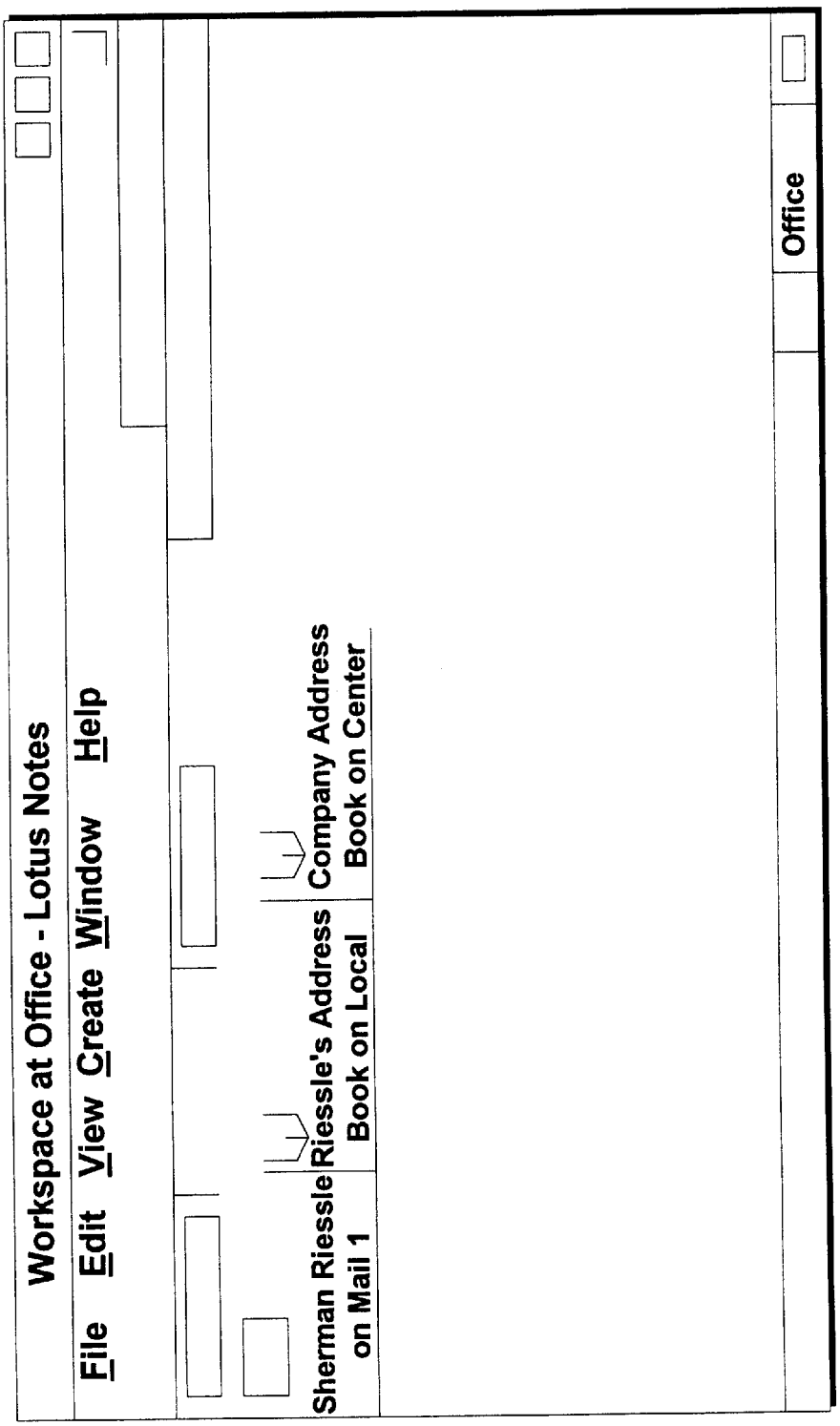
FIG. 1 is an illustration of a prior art Notes GUI for accessing a Notes database.
Figure 3:
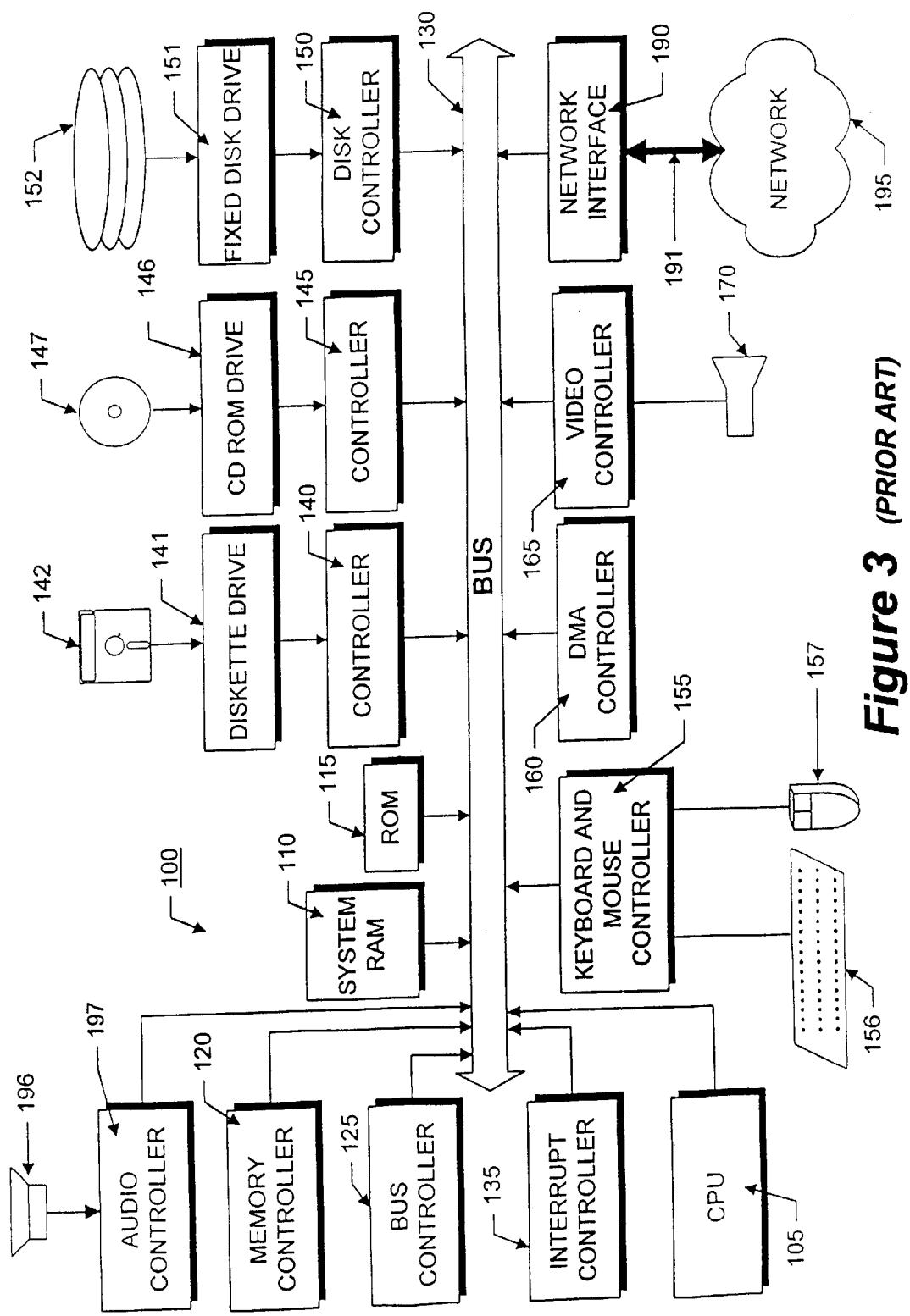
FIG. 3 is a block diagram of a computer system suitable for use with the present invention.

FIG. 3 illustrates the system architecture for an exemplary computer system 100, such as an IBM PS/2® computer, on which the invention can be implemented. The exemplary computer system of FIG. 3 is for descriptive purposes only and should not be considered a limitation of the invention. Although the description below may refer to terms commonly used in describing particular computer systems, such as an IBM PS/2 computer, the described concepts apply equally to other systems, including systems having architectures that are dissimilar to that shown in FIG. 3.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with computer system 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, a hard disk 152 is part of a fixed disk drive 151, which is connected to bus 130 by controller 150.

User input to computer system 100 may be provided by a number of devices. For example, keyboard 156 and mouse 157 are connected to bus 130 by keyboard and mouse controller 155. An audio transducer 196, which may act as both a microphone and a speaker, is connected to bus 130 by audio controller 197. It should be obvious to those reasonably skilled in the art that other input devices such as a pen and/or tablet and a microphone for voice input may be connected to computer system 100 through bus 130 and an appropriate controller. DMA controller 160 is provided for performing direct memory access to system RAM 110. A visual display is generated by a video controller 165, which controls video display 170. Computer system 100 also includes a communications adapter 190 which allows the system to be interconnected to a network 195 via bus 191. The network 195 may be a local area network (LAN) or a wide area network (WAN).

Computer system 100 is generally controlled and coordinated by operating system software, such as the OS/2® operating system (available from the International Business Machines Corporation, Boca Raton, Fla.) or WINDOWS® NT (available from Microsoft Corp., Redmond, Wash.). Among other computer system control functions, the operating system controls allocation of system resources and performs tasks such as process scheduling, memory management, networking and I/O services.

Figure 4:
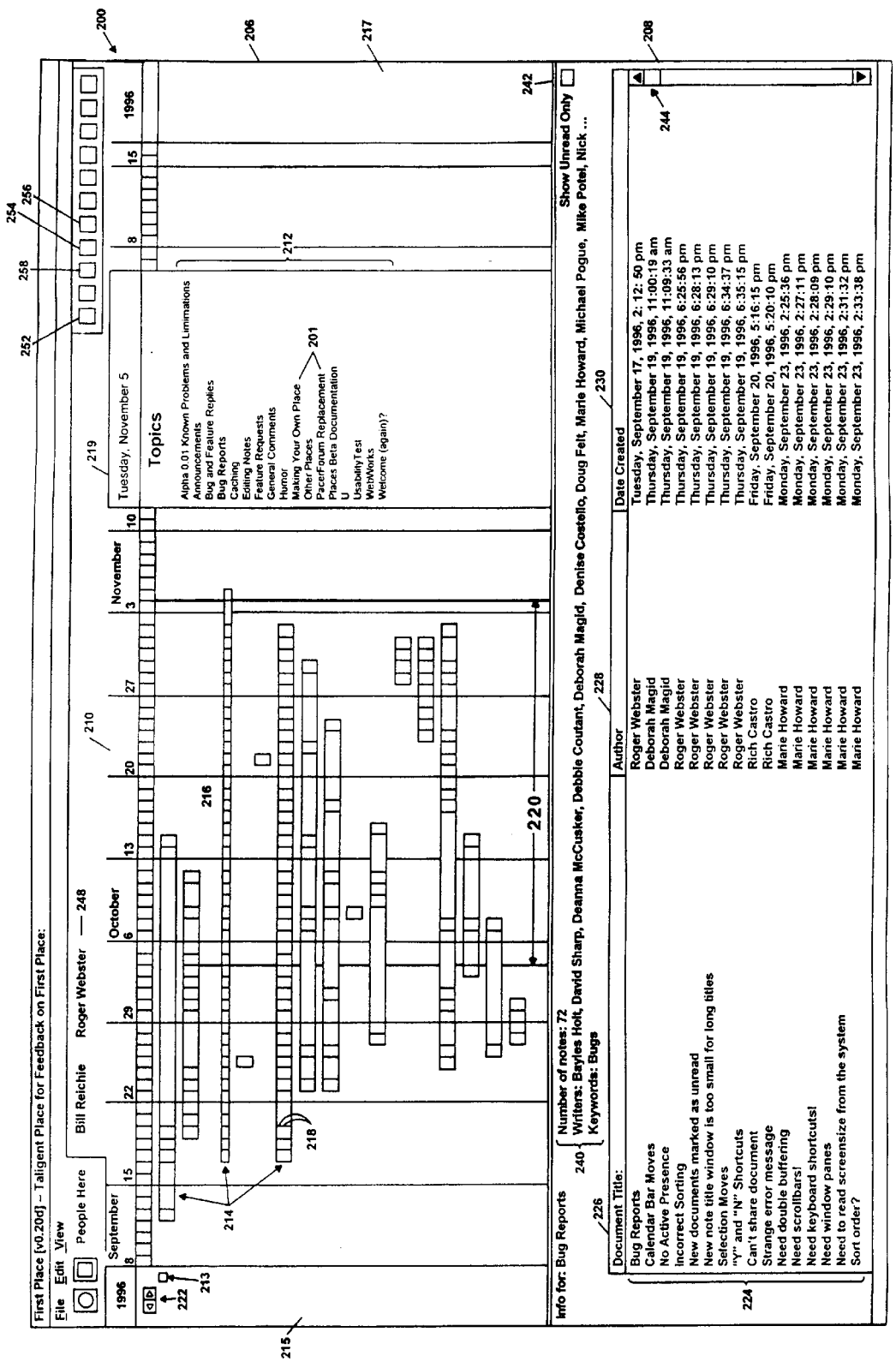
FIG. 4 is an illustration of a first database GUI having a calendar view and a report view.
Figure 5:
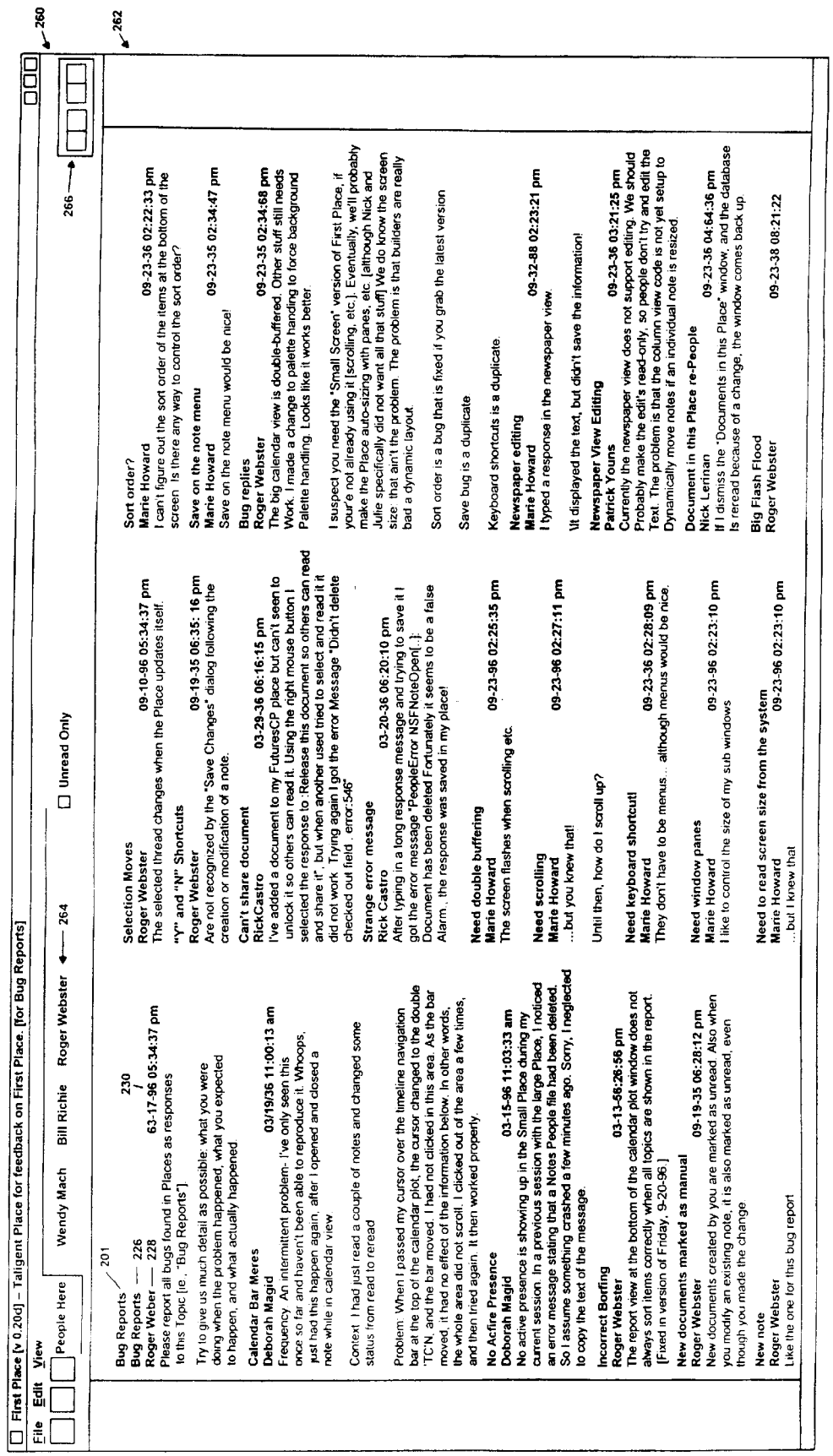
FIG. 5 is an illustration of a second database GUI having a response content view.

FIG. 4 shows a first GUI 200 for displaying information stored in an exemplary Notes database. The exemplary Notes database stores a plurality of topics 201 and responses to those topics 201 by a plurality of users of that database. As shown in FIG. 4, such topics 201 may include, "Announcements," "Bug Reports," and "Humor." Users may post responses either directly to topics 201 (topic responses 202) or indirectly to topics 201 by replying to earlier posted responses (reply responses 204). For example, a topic response 202 entitled, "Calendar Bar Moves" was posted by Deborah Magid on Sep. 19, 1996 in response to the topic 201, "Bug Reports." Similarly, a reply response 204 was posted by Roger Webster on Sep. 20, 1996 entitled, "Incorrect Sorting." As shown in FIG. 5 (discussed in detail below), each response includes the title of the response, the author, the time the response was posted, and text conveying the substance of the response. Any user may post a response any number of times on a given day.

The database may be created according to known methods. The exemplary Notes database, for example, may be a relational database having a plurality of responses (i.e. records) with multiple fields. These fields may include:

author of response;

title of the response;

topic being responded to;

date and time of creation of response;

title of earlier response being responded to, if any; and text written by author.

When creating a new record (i.e. response), the author enters the title of the response and the text. Notes automatically enters the remaining fields into the record.

The exemplary Notes database may be accessed simultaneously by a plurality of users. Accordingly, the first GUI

200 may be accessed and displayed on the display 170 by any of those users simultaneously. To that end, a second (non-relational) database is used by the invention to store information about such database users. This non-relational database may include a record type defined as "active presence," having a single field that stores an identification string identifying each of the users having the first GUI 200 displayed on their displays 170. A user's identification string is entered into the second database once the first GUI 200 is displayed on that user's display 170. That user's identification string is deleted from the second database once the first GUI 200 is not displayed on that user's display 170.

As noted above, the first GUI 200 (FIG. 4) displays information related to the exemplary database in an easy, user friendly format. Specifically, the first GUI 200 graphically displays the number of responses that were posted to each of the topics 201 on each day of a selected time period. For example, the first GUI 200 graphically indicates that the topic 201 "Bug Reports" had one response posted on Sep. 17, 1996, six responses posted on Sep. 19, 1996, two responses posted on Sep. 20, 1996, etc. . . . To effectuate this functionality, the first GUI 200 includes a calendar view 206 and an adjacent report view 208. The calendar view 206 is a two-dimensional grid having a timeline 210 along the horizontal dimension, an index 212 listing a plurality of topics 201 along the vertical dimension, and a plurality of horizontal markings 214. The horizontal markings 214 have one or more darkened rectangular boxes 216 aligned with the intersection of a topic 201 and a date. For example, the topic 201 "Bug and Feature Replies" has a first box lined up with Oct. 22, 1996, a second box lined up with Oct. 23, 1996, and a third darkened box lined up with Oct. 25, 1996. This alignment visually indicates that at least one response was posted to that topic 201 on those dates. No responses were posted to that topic 201 on any other days. The darkened boxes 216 also include lines 218 to visually indicate the number of responses on a given day. In the exemplary database, the number of responses is equal to one more than the number of lines 218 within each box so that the box is broken into a number of sub-boxes which equal the number of responses. For example, the topic 201 "Bug and Feature Replies" received one posting on Oct. 22 and 25 of 1996 (i.e. no lines 218 in the box 216), and three postings on Oct. 23, 1996 (two 218 in the box). Although rectangular boxes 216 with lines 218 are shown, any indicia may be used that effectuates the purpose of the first GUI 200.

The timeline 210 can be scrolled infinitely into the past and future. This is useful when a second, older database is combined with the exemplary database. When scrolling the timeline 210, responses that pass out of the field of view are graphically displayed as flags 213 that may be displayed either in a past space 215 or in a future space 217 on the calendar view 206. Clicking on one of the flags causes the computer to display a listing, in front of the calendar view 206, of the responses represented by the selected flag 213. The listing may include the author 228, title 226, and posting date 230 of each of the represented responses. Selection of one of the represented responses causes the timeline 210 to display the time period around the posting date of the selected represented response. Subsequent selection of a "today's date" button 219 returns the timeline 210 to the current date.

The calendar view 206 also may include two vertical lines 220 to visually block off a preselected block of time. As shown in FIG. 4, this block of time may be one month. Scroll buttons 222 may also be included to scroll the timeline 210.

Any one of the topics 201 listed along the vertical dimension of the calendar view 206 may be selected to display a list 224, in the report view 208, of each response posted to the selected topic 201. Accordingly, the report view 208 includes headings for listing the title 226, author 228, and creation date 230 of each response to the selected topic 201. When any one of the listed authors' names is clicked in the report view 208, a second GUI 232 having information about the selected author (FIG. 8, discussed below) will appear in front of the first GUI 200. The report view 208 also includes indicia 240 indicating the number of responses to the topic 201, the names of all authors who responded to the topic 201, and any keywords that may have been used. An unread only button 242 may also be included to display unread responses only. Response scroll buttons 244 may also be included to scroll through the responses listed in the report view 208.

The first GUI 200 further includes a listing of each user currently having the first GUI 200 displayed on their displays 170. This listing is displayed in an active presence view 248 on the first GUI 200 which begins with the text "People Here." The first GUI 200 obtains this information from the active presence records in the second database. The letters of the user's names may also be colored to indicate whether the first GUI 200 is in the foreground of the user's display 170. In the preferred embodiment, a user's name is displayed with red letters when the first GUI 200 is in the foreground, and black letters when the first GUI 200 is not in the foreground.

A means for displaying a summary of all responses posted on a specified date to a selected topic may be included in the first GUI 200. To that end, an enable button (not shown) may be included on the first GUI 200 that causes a response list window (not shown) to be displayed over the first GUI 200 when the cursor is passed over one of the darkened boxes 216 for a selected topic. The response list window may include the title 226 and author 228 of each response posted on that selected date. Double clicking on one of the responses listed in the response list window causes the user's computer system 100 to display the entire response over the first GUI 200.

The first GUI 200 may also include a plurality of buttons 252 to perform miscellaneous functions. For example, several buttons can be included to move to another GUI for that database, or to a GUI for another database. Similarly, buttons 254, 256 for creating a new topic 201 or a new response can also be included. A search button 258 may also be included to search for keywords in the titles of the responses.

During installation, one or more people may be assigned duties within the exemplary database. For example, one person may be assigned the duty of "administrator" to update and trouble-shoot problems with the exemplary database, and another person may be assigned the duty of "response reviewer" to review responses for content and relevance to particular projects. The duties are stored in a duty database, created upon installation of the exemplary database, which may include the fields "name" and "duty to be performed by named person." The duty database may be accessed by known means for review or modification by authorized users.

Each of the responses shown in the first GUI 200 may be directly accessed either by clicking on a response title listed in the report view 208, or by clicking on one of the darkened rectangular boxes 216 on the calendar view 206. This causes a third GUI 260 to be displayed in front of the first GUI 200. As shown in FIG. 5, the third GUI 260 includes a response view 262 and an active presence view 264. The active presence view 264 shows the users displaying the third GUI 260. The function and operation of the third GUI active presence view 264 are identical to those of the active presence view 248 in the first GUI 200. The response view 262 includes the title, author, posting date, posting time, and content of each selected response(s). Preferably, the content of the selected responses cannot be edited unless the user viewing the third GUI 260 is the author of the posted response. The content of certain selected response may be omitted, however, to display the title, author posting date and posting time only. This is useful in a number of instances, such as when one or more of the responses had already been read by the user accessing the third GUI 260. A plurality of buttons 266 similar to those in the first GUI 200 may also be included to increase the functionality of this GUI.

A user may scroll through the responses displayed in the response view 262 in accordance with any method known in the art. It is preferred that the responses be scrolled in a "serpentine" manner in which each column scrolls into the adjacent column as the display is scrolled. For example, with reference to FIG. 5, when the left column (i.e. having the heading "Bug Reports") is scrolled upwardly by one response, the response at the top of the center column will be moved to the bottom of the left column. The response at the top of the right column consequently will move to the bottom of the center column. Each of the other responses will similarly move upwardly by one response. The response view 262 also may be scrolled on a column by column basis, or on a page by page basis.

The display of responses in the response view 262 may be customized to display selected groups of responses. To that end, means are included for displaying responses having common posting dates 230 for a selected topic, authors 228, and topics. For example, double-clicking on one of darkened boxes 216 (in the calendar view 206) will group according to responses to a selected topic on a specific date. As further examples, double-clicking on a date in the timeline 210 will group according to common posting dates 230, and double-clicking on an author's name in a fourth GUI 268 (discussed in detail below) will group according to one of the author's names.

Figure 6:
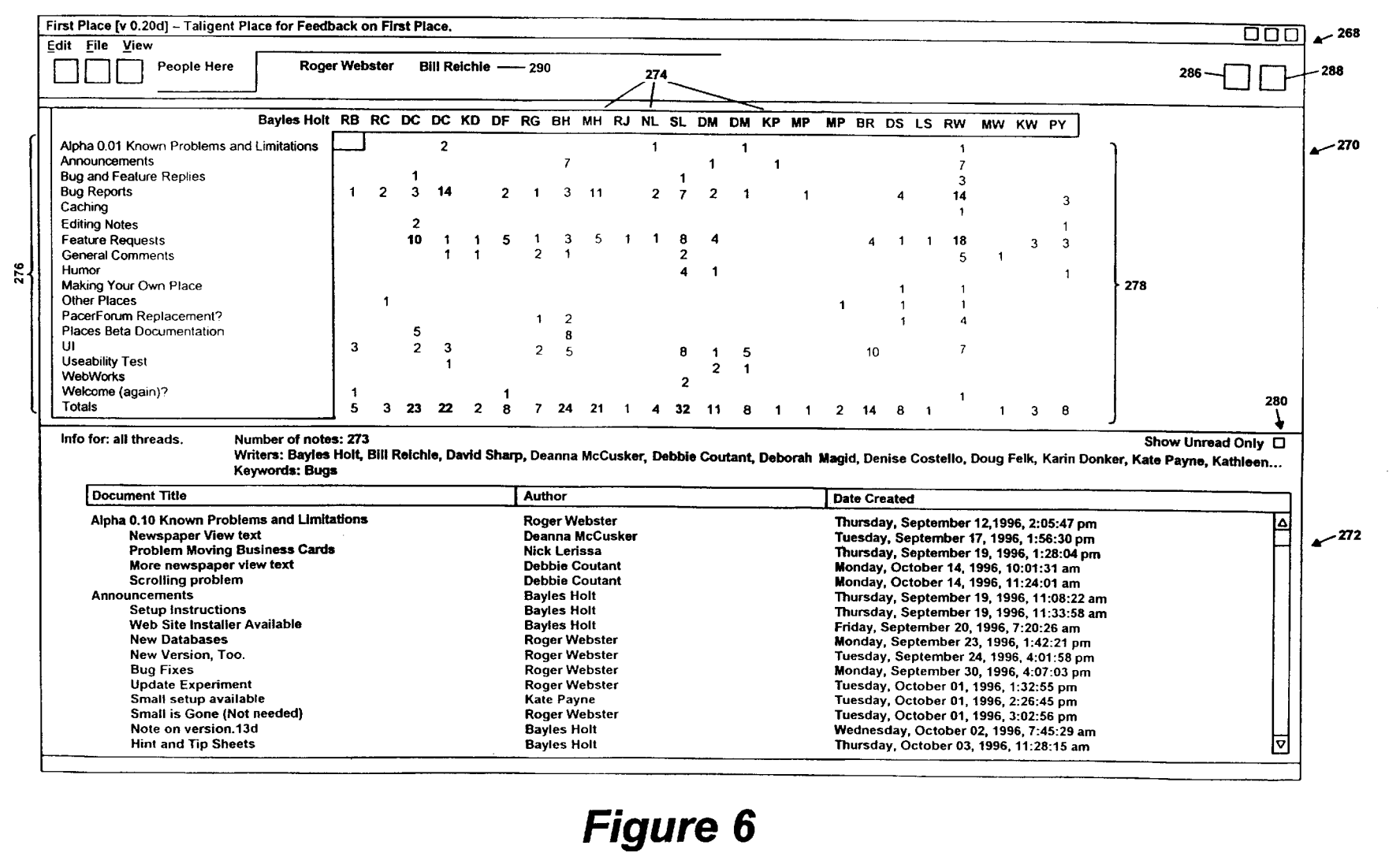

FIG. 6 shows the fourth GUI 268 that summarizes, in an easy and user-friendly format, the number of responses to each of the topics 201 by each of the users. To that end, the fourth GUI 268 includes a user frequency view 270 and an adjacent report view 272. The user frequency view 272 is a two-dimensional grid having the initials 274 of each of the users along the horizontal dimension, and a listing 276 of the topics 201 along the vertical dimension. A plurality of numbers 278, each representing the number of responses to a topic 201 by a user, are positioned at the intersection of the initials 274 and the topics 201. For example, user "RB" posted one reply to the topic 201 "Bug Reports," three replies to topic 201 "UI," and one reply to topic 201 "Welcome (again)?." The numbers 278 can also have a colored background to visually indicate more or less usage by a user. In the preferred embodiment, the background successively changes from white (lowest), to yellow (low medium), then to orange (high medium), and finally to red (highest) as the number of responses increases.

Similar to the report view 208 in the first GUI 200, the report view 272 in the fourth GUI 268 lists the title of selected responses, their authors, and the date and time that those responses were posted. In the preferred embodiment, those selected responses are selected by the user when one of the numbers 278 in the grid is clicked. This causes all of the responses represented by that number to be listed in the report view 272. For example, if the number "2" is double clicked under the initials 274 "DC," the two responses posted by user "DC" in reply to the topic 201 "Alpha 0.10 Known Problems and Limitations" will be listed in the report view 272.

The report view 272 in the fourth GUI 268 has a number of functions and features that are identical to those in the first GUI report view 208. A first such function is effectuated when an author's name is double-clicked, causing the second GUI 232 (FIG. 8) to be displayed in front of the fourth GUI 268, thus displaying information related to the selected author. A second function is effectuated when the title of the response is double-clicked, causing the third GUI 260 (FIG. 5) to appear showing the content of the response. An unread only button 280 that causes the report view 272 to show only unread responses also may be included. Further, like the first GUI report view 208, the number of responses, writers of the notes, and keywords may be displayed in the fourth GUI report view 272.

Like the first GUI 200, the fourth GUI 268 may also include a plurality of buttons (not shown) to perform miscellaneous functions. For example, several buttons can be included to move to another GUI. Similarly, buttons 286, 288 for creating a new topic or a new response may also be included. An active presence view 290 showing users displaying the fourth GUI 268 may also included. The function and operation of the fourth active presence view 290 are identical to those of the active presence view 248 in the first GUI 200.

Figure 7A:
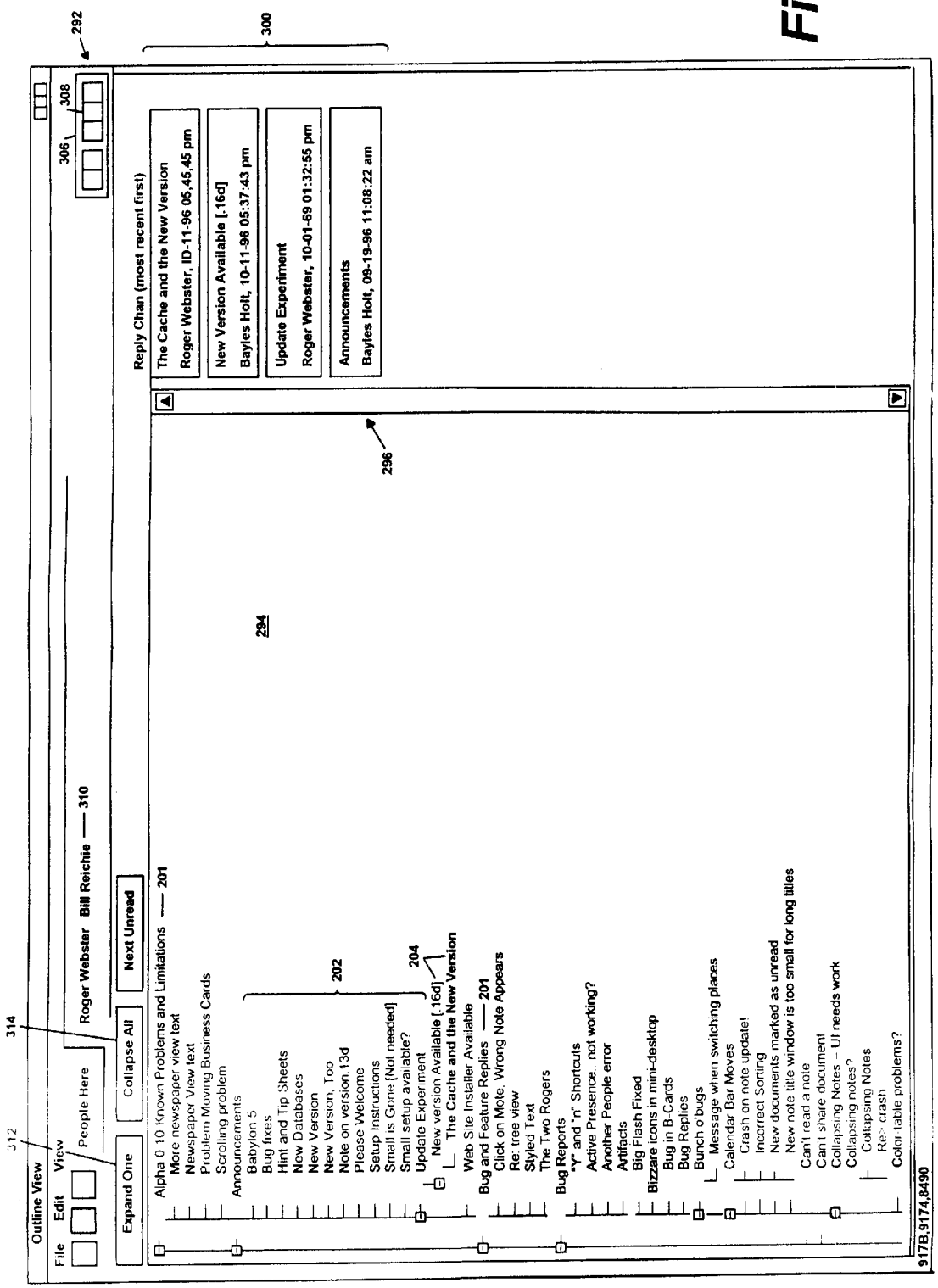
FIG. 7A is an illustration of a fourth database GUI having an outline view and a response chain view.

FIG. 7A shows a fifth GUI 292 having an outline view 294 that lists each of the responses in the database under the topic 201 to which they respond. Specifically, the topics 201 listed in the outline view 294 are not indented while topic responses 202 are indented one unit to the right more than the topics 201. Similarly, reply responses 204 are grouped under the previously posted responses to which they respond (parent responses) and are indented one unit to the right more than their respective parent responses. This format enables a user to quickly and easily differentiate between topic responses 202 and reply responses 204. It also visually indicates the relationship between different responses in the database.

Figure 7B:
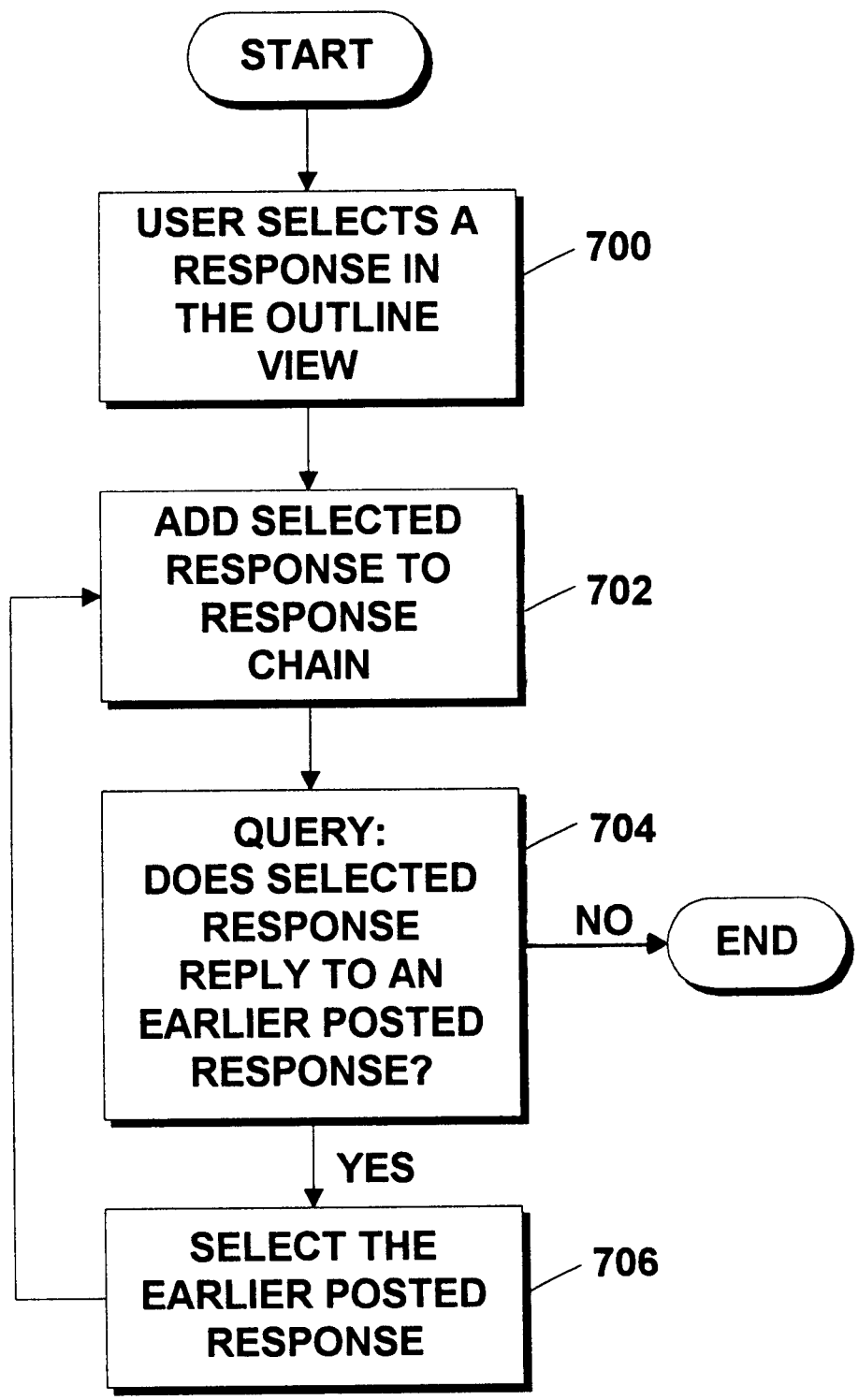
FIG. 7B is a flow chart illustrating the process of forming a response chain.

The fifth GUI 292 also has a button view 296 having buttons 300 for accessing each response in a selected response chain. FIG. 7B details the process of forming a response chain. Specifically, a response is selected by a user in the outline view 294 at step 700. This selected response is added to the response chain at step 702. If the selected response is not a reply to an earlier posted response, the process is ended, thus yielding the fully formed response chain (step 704). If the selected response is a reply to an earlier posted response, that earlier selected response is selected at step 706 and fed back to step 702. This process continues until the response chain is fully formed. After the response chain is fully formed, a button 300 for each response in the response chain are formed in the button view 296. Clicking on one of the buttons 300 causes the computer to display the response whose title is displayed on the button 300.

Like the first GUI 200, the fifth GUI 292 may also include a plurality of other buttons to perform miscellaneous functions. For example, several buttons (not shown) can be included to move to another GUI. Similarly, buttons 306, 308, and 309 for creating a new topic 201, a new topic response 202, or a new reply response 204 may also be included. An active presence view 310 showing users displaying the fifth GUI 292 may also included. The function and operation of the fifth active presence view 310 are identical to those in the first GUI 200. The fifth GUI 292 may also have expand and collapse buttons 312, 314 to expand or collapse the listing of responses in the outline view 294.

Figure 8:
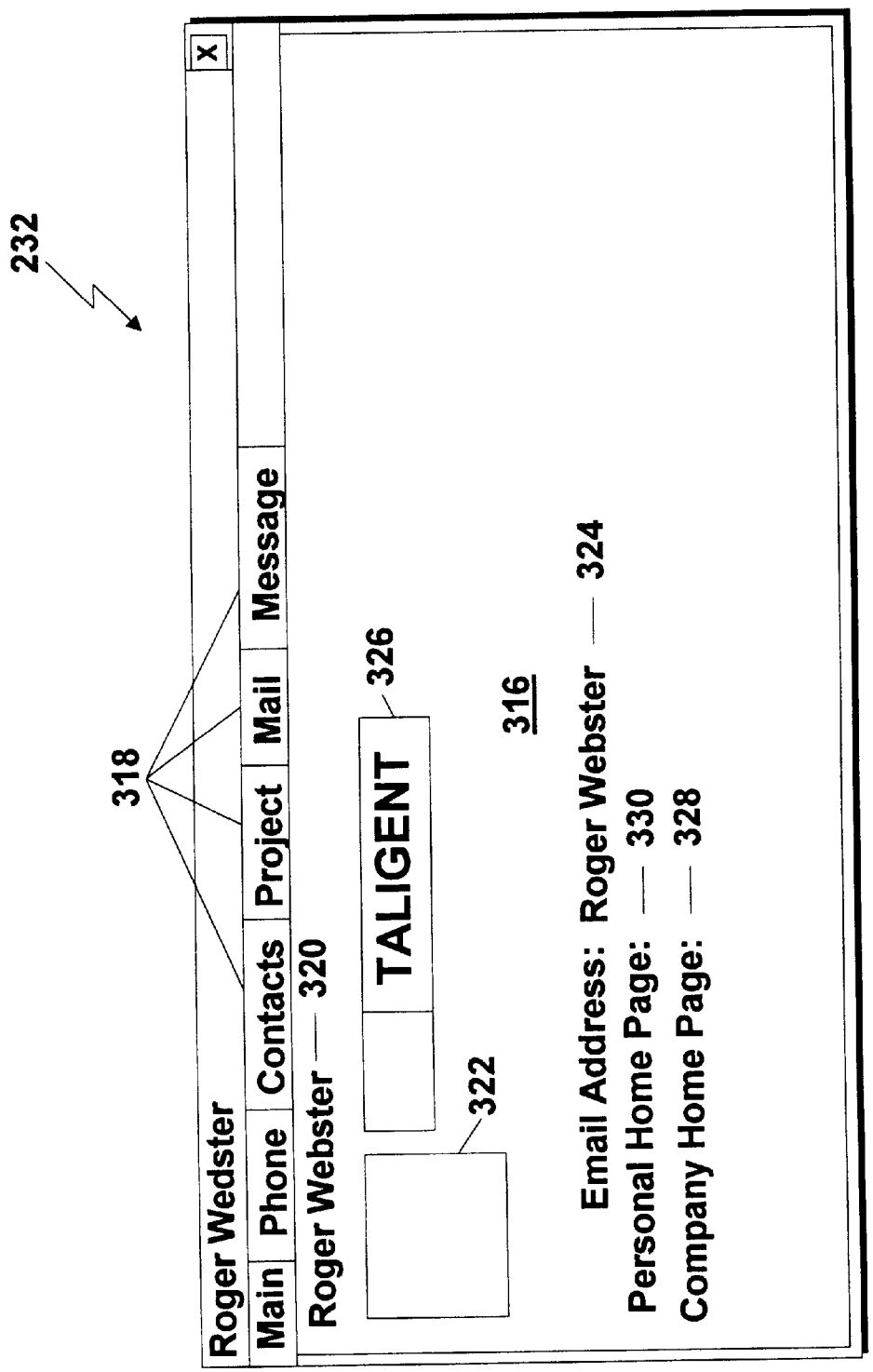
FIG. 8 is an illustration of a fifth database GUI having a display view showing the world wide web home page address for a user.

As previously noted, the second GUI 232 (FIG. 8) is displayed when an author's name is double clicked in either the first GUI report view 208 or the fourth GUI report view 272. The second GUI 232 both displays information related to the selected author, and enables the selecting user to send an electronic message to the selected author. To that end, the second GUI 232 includes a display view 316 and a plurality of labeled tabs 318 adjacent to the display view 316. When a tab is clicked, the display view 316 displays indicia that is related to the clicked tab label. For example, as shown in FIG. 8, the preferred embodiment includes the tabs 318 "main," "phone," "contacts," "project," "mail," and "message." Each of these tabs 318 provides indicia related to the labeled topic 201. The indicia may be buttons or other indicia that have a preselected function when clicked.

In the preferred embodiment (FIG. 8), when the "main" tab is selected, the computer displays the author's name 324, picture 322, email address 324, company logo 326, company world wide web home page address 328, and personal world wide web home page address 330. This information is stored in a Notes-based global address book database which is created when the Notes system is installed. The address book database includes information for display by each of the tabs. Clicking on either of the world wide web home page addresses 328, 330 causes the computer to connect directly to the selected world wide web home page. This connection is made through conventional means. The "phone," "contacts," and "project" tabs 318 respectively include indicia related to the author's various business and personal phone numbers (and fax numbers), relatives of the author to contact in an emergency, and company projects involving the author. The "mail" tab displays the electronic mail in the author's electronic mailbox queue.

The second GUI 232 may be customized by known methods, such as a Wizard program that guides a user through setting and/or modifying the display of that user's data in the second GUI. The user may therefore add and/or move images, logos, personal or professional data, and other information as desired.

An electronic message may be sent to the author by selecting the "message" tab. This causes the computer to display an electronic mail template having a message space for the user to enter a text message. After entering a text message, the user sends the message to the author by conventional means. Since both the source and destination of the electronic mail message are known, both are automatically entered into the message for transmission to the author. After the message is sent, it is temporarily stored in the second database as a data type "message" having fields "to," "from," and "body of message." The next time either of the first, second, third, fourth, or fifth GUIs are displayed by the author's computer, the message will be transmitted to and displayed by the author's display 170. The message record is deleted from the second database after receipt of the message by the author. If any one of the inventive GUIs are displayed by the computer when the message is sent, it is expected that the message will be displayed by such author's computer within two to three seconds of transmission.

The message tab also includes means for sending instant messages to an author's display 170. After being sent, instant messages are displayed immediately (i.e., within two to three seconds) on the receiving author's display 170. In the event that the receiving author is not accessing the exemplary database, the instant message will be displayed immediately after the receiving author subsequently accesses the exemplary database. Like the previously discussed electronic messages, after selecting the message tab, the computer displays an electronic mail template having a message space for the user to enter a text message. Since both the source and destination of the instant message are known, both are automatically entered into the message for transmission to the selected author. After entering the text message and selecting a "send instant message" command button, the text message is displayed on the receiving author's display immediately, or immediately after receiving author's subsequent access into the exemplary database. After selecting the send instant message command button, the instant message is temporarily stored in the second database, until deleted by the receiving author, as a data type "message" having fields "to," "from," and "body of message." Unlike the previously discussed electronic messages, an instant message does not require a receiving author to check an electronic mailbox for messages.

Instant messages may also be sent to any number of users currently using the exemplary database. To that end, the electronic mail template may include an "additional users" space for directing the instant message to additional users of the exemplary database. User's names may be entered into the additional users space to direct the instant message to the preselected additional users. Names entered into the additional users space are automatically entered into the field "to" in the second database.

Each database having topics, topic responses 202, and reply responses 204 has a set of the previously discussed inventive GUIs for their access. Although a Notes-based database was discussed in connection with the invention, any known database application program product may be used in connection with the inventive GUIs. The database may reside on a server in a local area network, or on a remote storage site that is accessible through the Internet.

The invention may be used with many different types of databases having different proprietary formats by means of a database interface module. Such types of databases may be accessed through the Internet. Among other advantages, the interface module enables the invention to be updated without requiring the updating code to be directed to every different type of database that may be accessed. The interface module may be considered to be a means for iterating through both file system entities (e.g., volumes, directories, and files) and database records from a wide range of different proprietary databases. To that end, the interface module includes a code library that is implemented as a dynamic link library ("DLL"). The DLL creates a two-dimensional table, from the information in the databases being accessed, that is in a form readable to the invention. The rows of the two-dimensional table are either database records or file system entities, and the columns are, respectively, either database fields or file system attributes. The table is formed from input data that may be either a PDS file for database records and file system entities, or a path to a file system directory for file system entities only. A PDS file is a file (with a .pds extension) containing information that allows the DLL to establish a data source (i.e. the two-dimensional table) for either file system entities or database records. The contents of a PDS file are known in the art.

The protocol for establishing a data source (i.e. the two-dimensional table) from a data source specification is as follows:

OpenDataSource: takes a fully-qualified path to either a PDS file or a directory, and returns a "handle" for use in subsequent conversations with the library;

CloseDataSource: takes a handle to a previously opened data source and frees all resources associated with the Data Source;

FirstRow: takes a handle to a previously opened data source; moves the internal table row index to the beginning of the data source; returns true if successful;

NextRow: takes a handle to a previously opened data source; moves the internal table row index to the next logical record in the data source; returns true if successful;

Columns: takes a handle to a previously opened data source; returns the number of columns available;

Rows: takes a handle to a previously opened data source; returns −1 for database data sources (since the total number of records is often not known until the database has been completely iterated through), and the actual number of rows in a file system data source;

Column: takes a handle to a previously opened data source, the index of the column of interest, and a pointer to a string to be filled in with the result;

ColumnType: takes a handle to a previously opened data source and the index of the column of interest; returns a type code indicating the actual type of the data in the specified column;

DisplayColumnName: takes a handle to a previously opened data source and the index of the column of interest; in the case of a database data source, a configuration-time supplied user-friendly name field is returned (this info is stored in the PDS). In the case of a file system data source, the field names are TBD.

ActualColumnName: takes a handle to a previously opened data source and the index of the column of interest; in the case of a database data source, the actual name of the database field is returned (this information is stored in the PDS). In the case of a file system data source, this call returns the same information as DisplayColumnName.

In an alternative embodiment, the interface module also may be, for example, the record maintenance interface disclosed in U.S. Pat. No. 5,522,066 (Liu), the disclosure of which being incorporated herein by reference, in its entirety.

In another alternative embodiment, the invention may be implemented as a computer program product for use with a computer system. Such implementation may include a series of computer instructions fixed either on a tangible medium, such as a computer readable media (e.g. diskette 142, CD-ROM 147, ROM 115, or fixed disk 152 as shown in FIG. 3) or transmittable to a computer system, via a modem or other interface device, such as communications adapter 190 connected to the network 195 over a medium 191. Medium 191 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over a network (e.g., the Internet or World Wide Web).

Each of the inventive GUIs may be constructed by conventional software programming techniques known in the art. It is preferred that the GUIs be constructed by visual builders, such as OCX™ (available from Microsoft Corp.) or Delphi™ (available from Borland Corp.). Database functions, such as storing information, searching through records, accessing records, and modifying records, are all performed by the underlying database application program product. The exemplary database uses Notes to perform each of those functions.

Although various exemplary embodiments of the invention have been disclosed, it will be apparent to those skill in the art that various changes and modifications can be made which will achieve some of the advantages of the invention without departing from the spirit and scope of the invention. These and other obvious modifications are intended to be covered by the appended claims.

Having thus described the invention, what we desire to claim and secure by Letters Patent is:

1. Apparatus for use with a computer system having a memory and a display, the apparatus residing in the memory and generating a graphical user interface displaying information related to a database on the display, the graphical user interface comprising:

a user frequency view having a two-dimensional grid display comprising a first axis having a plurality of identifiers spaced along the first axis, each identifier uniquely identifying one of a plurality of users, and a second axis having a plurality of topic names spaced along the second axis, the user frequency view further having a first number displayed on the grid indicating the frequency that one of the plurality of users, identified by the position of the first number along the first axis, replies to one of the plurality of topics, identified by the position of the first number along the second axis, the replies each being in the form of a response stored in the database;

a report view adjacent to the user frequency view, the report view having means for displaying information relating to at least one response posted by the one of the plurality of users when the first number is selected.

2. The apparatus as defined by claim 1 wherein the user frequency view includes a second number indicating the total replies posted to the at least one topic and means for displaying, in the report view, information relating to all responses posted in reply to the at least one topic when the second number is selected.

3. The apparatus as defined by claim 1 wherein the user frequency view includes means for displaying, in the report view, information relating to all responses posted by one of the plurality of users when one of the plurality of identifiers associated with the one of the plurality of users is selected.

4. The apparatus as defined by claim 1 wherein the user frequency view includes means for displaying, in the report view, information relating to all responses posted to one of the plurality of topics by one of the plurality of users when the second number is selected.

5. The apparatus as defined by claim 1 wherein the graphical display means includes colored indicia.

6. The apparatus as defined by claim 1 further including means for identifying one or more users simultaneously using the graphical user interface.

7. The apparatus as defined by claim 1 wherein the report view includes means displaying, in front of the graphical user interface, the content of the at least one response displayed in the report view.

8. The apparatus as defined by claim 7 wherein the means for displaying the content of the at least one response formats the response into columns.

9. The apparatus as defined by claim 1 wherein the report view includes means for excluding indicia, relating to all previously read responses, from being displayed in the report view.

10. A method of summarizing information stored in a database, the method being for use with a computer system having a memory and a display, and generating a graphical user interface displaying information related to a database on the display, the method comprising the steps of:

A. accessing the database, the database containing a plurality of topics and responses posted to those topics;

B. displaying a two-dimensional grid on a display device, the grid having a plurality of identifiers displayed along a first axis, each identifier uniquely identifying one of a plurality of users, a list of the plurality of topic names stored in the database displayed along the second axis, and a frequency number aligned with both one of the identifiers and one of the topic names, the frequency number indicating the number of responses posted to the one of the topic names by the user identified by the one of the identifiers; and C. displaying, adjacent to the grid, report indicia related to at least one of the responses posted to the one of the topics by one of the users identified by the one of the identifiers when the frequency number is selected by a user.

11. The method of summarizing information stored in a database as defined by claim 10, comprising the further step of:

D. displaying, in response to a user selecting the frequency indicia, indicia related to each response posted to the one of the topics by the user identified by the one of the identifiers.

12. The method of summarizing information stored in a database as defined by claim 10, comprising the further steps of:

E. accessing a second database containing the names of the users displaying the two-dimensional grid; and F. displaying the names of the users listed in the second database.

13. The method of summarizing information stored in a database as defined by claim 10, comprising the further step of:

G. displaying, in response to a user selecting the report indicia, the content of the response related to the selected report indicia.

14. A computer program product for use with a graphics display device, the computer program product generating a graphical user interface for summarizing information stored in a database, the database containing a plurality of topics and responses posted to those topics, the computer program product comprising a computer usable medium having computer readable program code thereon, including:

program code for accessing the database;

program code for displaying a two-dimensional grid on a display device, the grid having a plurality of identifiers displayed along a first axis, each identifier uniquely identifying one of a plurality of users, a list of the plurality of topic names stored in the database displayed along the second axis, and frequency indicia aligned with both one of the identifiers and one of the topic names, the a frequency number indicating the number of responses posted to the one of the topics by the user identified by the one of the user-identifying indicia; and program code for displaying, adjacent to the grid, report indicia related to at least one of the responses posted to at least one of the topics when the frequency number is selected by a user.

15. The computer program product as defined by claim 14 further including program code for displaying, in response to a user selecting the frequency number, indicia related to each response posted to the one of the topics by the user identified by the one of the user-identifying indicia.

16. The computer program product as defined by claim 14 further including:

program code for accessing a second database containing the names of the users displaying the two-dimensional grid; and program code for displaying the names of the users listed in the second database.

17. The computer program product as defined by claim 14 further including program code for displaying, in response to a user selecting the report indicia, the content of the response related to the selected report indicia.

* * * * *